(12) United States Patent
Takatsugi et al.

(10) Patent No.: US 7,654,809 B2
(45) Date of Patent: Feb. 2, 2010

(54) INJECTION MOLDING MACHINE HAVING A FORCE PEAK TIME DETECTING DEVICE

(75) Inventors: Satoshi Takatsugi, Yamanashi (JP); Tatsuhiro Uchiyama, Yamanashi (JP); Junpei Maruyama, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 178 days.

(21) Appl. No.: 11/876,462

(22) Filed: Oct. 22, 2007

(65) Prior Publication Data

US 2008/0152748 A1 Jun. 26, 2008

(30) Foreign Application Priority Data

Dec. 20, 2006 (JP) ............... 2006-343151

(51) Int. Cl.
*B29C 45/77* (2006.01)

(52) U.S. Cl. .................................... 425/145; 425/149

(58) Field of Classification Search ................ 425/145, 425/149

See application file for complete search history.

(56) References Cited

U.S. PATENT DOCUMENTS

| 5,153,149 | A | 10/1992 | Naito et al. |
| 7,074,028 | B2 | 7/2006 | Watanabe et al. |
| 7,452,198 | B2 * | 11/2008 | Shiraishi et al. ............. 425/145 |
| 2004/0142056 | A1 | 7/2004 | Watanabe et al. |

FOREIGN PATENT DOCUMENTS

| DE | 19834086 C1 | 1/2000 |
| EP | 1439047 A1 | 7/2004 |
| JP | 1-168421 A | 7/1989 |
| JP | 03-092321 A | 4/1991 |
| JP | 04-053720 A | 2/1992 |
| JP | 04-201225 A | 7/1992 |
| JP | 4284221 A | 10/1992 |
| JP | 2004-216808 A | 8/2004 |
| JP | 2006-069219 A | 3/2006 |

OTHER PUBLICATIONS

EP Search Report for 07119481.5 dated Nov. 19, 2008.

* cited by examiner

*Primary Examiner*—Tim Heitbrink
(74) *Attorney, Agent, or Firm*—Lowe Hauptman Ham & Berner, LLP

(57) ABSTRACT

If a screw is moved forward after a metering step is completed, the screw moves in a state where a check ring on a tip end of the screw is in open state. Resin flows in a direction opposite to the injection direction. A rotational force is applied to the screw due to the backflow of the resin. If the check ring closes a resin passage, the rotational force acting on the screw is reduced. A peak time of the screw rotational force is detected as closing point in time of the check ring. Physical amounts such as a screw rotational force and a screw position at that timing are detected. Since the closing point in time of the check ring is precisely detected, correction of the injection/hold pressure switching position and the injection speed switching position can be adjusted more precisely. It is possible to precisely determine whether a molded article is non-defective or defective based on the detected physical amount.

16 Claims, 8 Drawing Sheets

WHEN METERING
STEP IS COMPLETED

WHEN SUCK BACK
IS COMPLETED

AT CLOSING POINT IN TIME
AFTER INJECTION IS
STARTED

WHEN THE SCREW REACHES
INJECTION/HOLD PRESSURE
SWITCHING POSITION

WHEN METERING
STEP IS COMPLETED

WHEN SCREW MOVES
FORWARD AND CHECK
RING IS CLOSED

WHEN SCREW RETRACTS TO
INJECTION STARTING POSITION

STATE WHERE SCREW
MOVES FORWARD IN
INJECTION/HOLD PRESSURE STEP

INJECTION MOLDING MACHINE HAVING A FORCE PEAK TIME DETECTING DEVICE

RELATED APPLICATIONS

The present application is based on, and claims priority from, Japanese Application Number 2006-343151, filed Dec. 20, 2006, the disclosure of which is hereby incorporated by reference herein in its entirety.

BACKGROUND OF THE INVENTION

1. Field of the Invention

The present invention relates to an injection molding machine having a screw provided with a check ring.

2. Description of the Related Art

There is conventionally used an injection molding machine having an injection mechanism whose screw provided at its tip end with a check ring mechanism so as to prevent backflow of resin at the time of injection like an in-line screw type injection molding machine. FIG. 1 shows one example of the check ring mechanism. The screw 1 is provided at its tip end with a screw head 2. A portion of the screw 1 which is reduced in diameter is provided between the screw head 2 and a main body of the screw 1. A check ring 3 is provided at the diameter-reduced portion such that the check ring 3 can move in an axial direction of the screw. A check seat 4 is provided at the diameter-reduced portion and on the side of the main body of the screw 1. The check seat 4 comes into intimate contact with the check ring 3 to close a resin passage.

A resin pellet is supplied from a rear portion of the screw 1. The resin pellet is melted by shearing heat generated when the screw 1 rotates and by heat from a heater provided outside a cylinder into which the screw 1 is inserted. The molten resin increases a resin pressure behind the check ring 3 and generates a force for pushing the check ring 3 forward. If the check ring 3 is pushed forward, the resin located behind the check ring 3 passes through a gap between the check ring 3 and the diameter-reduced portion and flows forward of the check ring 3, and increases a pressure in the cylinder in front of the screw head 2.

If a pressure in front of the check ring 3 exceeds a predetermined pressure (back pressure), the screw 1 is pushed backward, and the pressure in front of the check ring 3 is reduced. If the screw 1 rotates further, a pressure behind the check ring 3 becomes higher than the pressure in front of the check ring 3 and thus, resin which is continuously melted is sent forward of the check ring 3, and if the screw 1 is retreated by a predetermined amount, the rotation of the screw 1 is stopped (metering step).

Next, the procedure is advanced to an injecting step. If the screw 1 moves forward to charge resin, a resin pressure accumulated in front of the screw head 2 is increased and thus, the check ring 3 is retreated and comes into intimate contact with the check seat 4 to close the resin passage, and the charging pressure prevents backflow of the molten resin in the retracting direction of the screw. If the check ring 3 retracts and timing for closing the resin passage is varied, an amount of resin to be charged is also varied and the molding becomes unstable.

The check ring mechanism at the time of injection is closed when a pressure in front of the check ring 3 becomes higher than a pressure behind the check ring 3 due to forward movement of the screw 1. However, there is a problem that a pressure remains a groove 6 between flights 5 and the screw 1 behind the check ring mechanism immediately before injection, and the closing point in time is varied due to the remaining pressure. Backflow of resin is generated from the front portion toward the rear portion of the check ring until the check ring is closed after the injection is started. Therefore, the injection capacity is varied between cycles due to the variation of the closing point in time and as a result, this affects quality of a molded article. Hence, there is conceived means for closing the check ring 3 in stable timing every cycle, and there is proposed a method for monitoring the time at which the check ring 3 is actually closed.

(a) For example, Japanese Patent Applications Laid-open No. 4-53720 and No. 4-201225 disclose techniques in which a pressure sensor for detecting a resin pressure in the cylinder is provided at a location rearward from the check ring, the closing motion of the check ring is detected based on a pressure variation detected by the pressure sensor during forward movement of the screw, and it is determined whether the quality of a molded article is non-defective or defective and the molding condition is adjusted based on the detected close position of the check ring.

In the techniques described in the above patent documents, the pressure variation in the cylinder is detected to detect the close of the check ring. According to this method, it is necessary to dispose the pressure sensor behind the check ring. Further, it is necessary that the pressure sensor is disposed away from a tip end of the cylinder by at least the maximum injecting stroke. Therefore, a distance between the check ring and the pressure sensor is varied depending upon the magnitude of the injection stroke, and the detection precision is varied. It is preferable that an inner wall surface of a cylinder is not provided with a step and a smooth passage is formed so that carbide is not produced by the remaining resin. In this case, if a pressure sensor which comes into direct contact with resin is mounted, it is inevitable that a fine step is generated on inner surface of a cylinder, such an adverse influence that a carbide caused by remaining resin is mixed into a molded article can not be avoided. Further, since a distortion of a cylinder is indirectly detected without direct contact with resin, the detection precision is deteriorated in the case of a pressure sensor which detects a resin pressure. There are problems that any type of pressure sensor is expensive and its handling is troublesome, periodical maintenance and calibration are required.

(b) Japanese Patent Application Laid-open No. 3-92321 discloses a technique in which a conductive member is disposed in the check ring such as to be opposed to the ring valve rearward of the ring valve, and a position of the ring valve (e.g., closing point in time of the resin passage by the ring valve) is detected by detecting capacitance between the ring valve and the conductive member.

According to the technique for detecting the closing point in time of the ring valve by detecting the capacitance as described in the above patent document, there are drawbacks that the conductive member for detecting the capacitance must be disposed in the screw, a hole through which a wire passes must be formed in a center of the screw, a slip ring for taking out a measurement signal must be disposed in the screw and means for measuring the capacitance must be added, and the structure becomes complicated.

(c) Japanese Patent Application Laid-open No. 1-168421 discloses a technique in which, although detection of closing point in time of the check ring during injection is not disclosed, a rotation torque acting on the screw at the time of injection is detected, and abnormality such as damage of the check ring is detected based on this detected torque.

(d) Japanese Patent Application Laid-open No 2004-216808 discloses a technique in which if the screw is brought into its rotatable state and injection is started, then resin flows backward and the screw is rotated, but the check ring is closed and if the backflow of resin is stopped, the rotation of the screw is stopped, and this fact is utilized and the stop of rotation of the screw is detected as the closing point in time of the check ring, and a switching position of the injection speed and a switching position to the hold pressure are corrected based on the detected closing position of the check ring.

In the technique described in the above patent document, the stop of rotation of the screw which is rotatable during injection is detected, and then the close of the check ring is detected. As shown in FIG. 2, when backflow is generated, a force F acts on the flight 5 of the screw 1 by the backflow of resin. In a normal molding machine, a sensor for detecting a resin pressure is located rearward of the screw (rightward of the screw in the drawing paper), but this sensor detects a pressure acting in the axial direction of the screw with respect to the screw. Therefore, a resin pressure in front of the screw head is also applied to the sensor, and it is difficult to detect a force Fx in the axial direction component of the force flown-back resin acts on the flight.

According to the technique described in the above patent document, attention is paid to a component force Fθ in the rotation direction of the screw of a force flown-back resin acts on the flight, the stop of rotation of the screw which is rotatable during injection is detected and the close of the check ring is detected.

When the rotatable screw is rotated by the backflow resin, however, if the backflow amount is small, since a force for rotating the screw by the backflow resin is within a range of the maximum static friction force with respect to the cylinder, the screw does not rotate. If the backflow amount is increased and the force for rotating the screw exceeds the maximum static friction force, the screw starts rotating. If the screw once starts rotating, the state thereof is shifted to a dynamic friction region, the screw keeps rotating if the force for rotating the screw is greater than the dynamical friction force even if the force for rotating the screw by the backflow resin becomes lower than the maximum static friction force. Therefore, when the force for rotating the screw by the backflow resin is greater than the dynamical friction force and lower than the maximum static friction force, if the rotation of the screw has already been stopped, the stopped state continues, and if the screw was rotating, the rotating state is continued. Hence, it can not be said that a linear relation always exists between the magnitude of the backflow amount and the magnitude of the rotation amount. Therefore, in the case of the method for detecting the close of the check ring from the rotation amount of the screw as in the technique described in the above patent document, there is a possibility that the detection of the closing point in time includes an error.

In the technique described in the above patent document, the fact that the rotation of the screw is stopped is detected, but it is necessary to determine a threshold value for detecting the stop of the rotation. The rotation of the screw may be stopped gradually or abruptly. In order to precisely detect the stop of the rotation under such various conditions, it is necessary to appropriately set the threshold value. However, to obtain an appropriate threshold value, a number of steps are required, and if molding state is changed, the threshold value must be adjusted again in some cases.

(e) Japanese Patent Application Laid-open No. 2006-69219 discloses a technique in which a screw is reversely rotated after metering is completed, a backflow preventing mechanism for interrupting a metering portion and a front of a screw head is provided, and after metering is completed, the screw is reversely rotated, the metering portion and the front of the screw head are interrupted by the backflow preventing mechanism and then, injection is started, and it is determined whether a molded article is non-defective or defective based on a stroke position or stroke amount at the time of injection.

The technique described in the above patent document has a problem that the special backflow preventing mechanism which interrupts the metering portion and the screw head by reversely rotating the screw after the metering is completed is required, and this technique can not be applied to a molding machine having a general backflow preventing mechanism.

SUMMARY OF THE INVENTION

Hence, it is an object of the present invention to make it possible to more precisely detect closing point in time of check ring without using a special mechanism. It is another object of the invention to make it possible to determine whether a molded article is non-defective or defective, and to adjust a molding condition based on detected closing point in time.

An injection molding machine of the present invention comprises a screw having a check ring, rotation driving means for rotating the screw, axial direction driving means for driving the screw in its axial direction, and rotational force detecting means for detecting a rotational force acting on the screw. In the injection molding machine, when the screw is moved forward in a direction of injection by the axial direction driving means, a rotational force acting on the screw is detected by the rotational force detecting means; and the injection molding machine further comprises rotational force peak time detecting means which detects time at which the detected rotational force reaches a peak as closing point in time of the check ring. With this structure, the closing point in time of the check ring can precisely be determined.

The injection molding machine can further employ the following structures.

The rotational force peak time detecting means detects the closing point in time of the check ring by forwardly moving the screw in an injection/hold pressure step.

The rotational force peak time detecting means detects the closing point in time of the check ring by forwardly moving the screw during the period from completion of metering step to start of injection step.

The rotational force peak time detecting means detects the closing point in time of the check ring by forwardly moving the screw during the period from completion of injection/hold pressure step and metering step to start of injection step, and in the injection/hold pressure step, when a peak is not detected in the rotational force, time at which a rotational force, detected by forwardly moving the screw during the period from completion of metering step to start of injection step, reaches the peak is defined as closing point in time of the check ring.

The injection molding machine further comprises physical amount detecting means for detecting a physical amount relating to injection molding at the closing point in time of the check ring detected by the rotational force peak time detecting means, and first determining means which compares the physical amount detected by the physical amount detecting means with a predetermined tolerance, and when the detected physical amount is within the tolerance, the first determining means determines that a molded article is a non-defective article. The physical amount detected at the closing point in time of the check ring by the physical amount detecting means is one or more of the following physical amounts: a screw position, a movement distance of the screw during the time from the forward movement starting time of the screw to the closing point in time of the check ring, time elapsed during the time from the forward movement starting time of the screw to the closing point in time of the check ring, a molten resin pressure a moving speed of the screw, a rotational force detected by the rotational force detecting means, a time integration value of the rotational force during the time from the forward movement starting time of the screw to the closing point in time of the check ring, and a value obtained by integrating the rotational force during the time from the forward movement starting time of the screw to the closing point in time of the check ring with respect to the screw position.

The injection molding machine further comprises position detecting means for detecting a position of the screw in its axial direction, second determining means which obtains a difference between the screw position detected by the position detecting means at the closing point in time of the check ring, and the screw position detected at predetermined timing, compares the obtained difference with a predetermined tolerance, and determines, when the difference is within the tolerance, that a molded article is a non-defective article. The predetermined timing is one or more of the following timings: hold pressure completion timing, switching timing from the injection step to the hold pressure step, and timing at which the screw moved most forward in the injection/hold pressure step.

The injection molding machine further comprises position detecting means for detecting a position of the screw in its axial direction, means for storing a screw position detected by the position detecting means at the closing point in time of the check ring as a reference screw position, pressure detecting means for detecting a molten resin pressure, and third determining means which compares the molten resin pressure detected by the pressure detecting means when the screw reaches the reference screw position during the forward movement in a molding cycle after a molding cycle in which the reference screw position is stored, with a predetermined tolerance, and which determines, when the molten resin pressure is within the tolerance, that a molded article is a non-defective.

The injection molding machine further comprises elapsed time measuring means for measuring elapsed time from screw forward-movement starting time at the time the check ring is closed, means for storing the elapsed time measured by the elapsed time measuring means as reference screw forward movement elapsed time, pressure detecting means for detecting a molten resin pressure, and fourth determining means which compares, when elapsed time from the screw forward-movement starting time during the forward movement of the screw becomes equal to the reference screw forward movement elapsed time in a molding cycle after a molding cycle in which the reference screw forward movement elapsed time is stored, a molten resin pressure detected by the pressure detecting means with a predetermined tolerance, and which determines, when the detected molten resin pressure is within the tolerance, that a molded article is a non-defective article.

The injection molding machine further comprises position detecting means for detecting a position of the screw in its axial direction, injection/hold pressure switching position setting means for setting an injection/hold pressure switching position which is a screw position where the injection step is switched to the hold pressure step, reference check ring closing position setting means for setting a reference check ring closing position to correct the injection/hold pressure switching position, and injection/hold pressure switching position correcting means which detects a screw position at the closing point in time of the check ring, obtains a difference between the detected screw position and the reference check ring closing position, and corrects the injection/hold pressure switching position based on the obtained difference. The injection/hold pressure switching position is set using a distance from the screw position at the screw forward-movement starting time. The injection/hold pressure switching position is set using a distance from the screw position at the screw forward-movement starting time, and a screw position detected at the closing point in time of the check ring is detected as a distance from the screw position at the screw forward-movement starting time.

The injection molding machine further comprises position detecting means for detecting a position of the screw in its axial direction, injection speed switching position setting means for setting the screw position for switching the injection speed in the injection step, reference injection speed switching position setting means for setting a reference injection speed switching position to correct the injection speed switching position, and injection speed switching position correcting means which detects a screw position at the closing point in time of the check ring, obtains a difference between the detected position and the reference injection speed switching position, and corrects the injection speed switching position based on the obtained difference. The injection speed switching position is set using a distance from the screw position at the screw forward-movement starting time. The reference injection speed switching position is set using a distance from the screw position at the screw forward-movement starting time, and the screw position detected at the closing point in time of the check ring is detected as a distance from the screw position at the screw forward-movement injection starting time.

According to the present invention, since the closing point in time of the check ring can be detected more precisely, it is possible to easily and more precisely adjust the molding conditions such as the injection/hold pressure switching position and the switching position of the injection speed by the detected various physical amounts at the closing point in time of the check ring. Further, it is possible to more precisely determine whether a molded article is non-defective or defective based on the various physical amounts at the closing point in time of the check ring.

BRIEF DESCRIPTION OF THE DRAWINGS

These and other objects as well as features of the invention will become clear by the following description of preferred embodiments of the invention with reference to the accompanying drawings, wherein.

DETAILED DESCRIPTION OF THE PREFERRED EMBODIMENTS

First, operation of a screw up to an injection step after a metering step is completed and motion of a check ring will be explained.

FIG. 3A to FIG. 3D are explanatory diagrams of motion for executing the injection step after the metering step is completed.

Figure 3A:
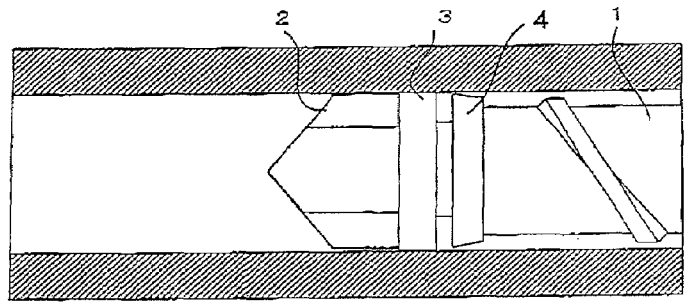
FIG. 3A to FIG. 3D are explanatory diagram of an operating state of the check ring mechanism when an injection/hold pressure step is executed after a metering step.

FIG. 3A shows a position of the screw when the metering step is completed and a state of a check ring mechanism. Molten resin is stored in a cylinder 7 at a tip end of a screw head 2, and the screw 1 is in its retreated position. In the metering step, resin molten by rotating the screw 1 rises a resin pressure behind the check ring 3, thereby generating a force for pushing the check ring 3 forward. As a result, if the check ring 3 is pushed out forward, the molten resin passes through a gap between the check ring 3 and the diameter-reduced portion of the screw 1 and flows in front of the check ring 3.

When the metering step is completed, the check ring 3 is located at a forward position as shown in FIG. 3A, the check ring 3 is in open state, and the passage for the molten resin is in open state. Since a difference between a pressure of the molten resin in the cylinder 7 at the tip end of the screw head 2 and a pressure of resin remaining in the groove 6 between the flights 5 of the screw 1 is small, the check ring 3 of the check ring mechanism is in an unstable state. If the screw 1 is moved forward and the injection is carried out from such a state, the closing point in time of the check ring 3 is varied in accordance with the pressure difference.

Figure 3B:
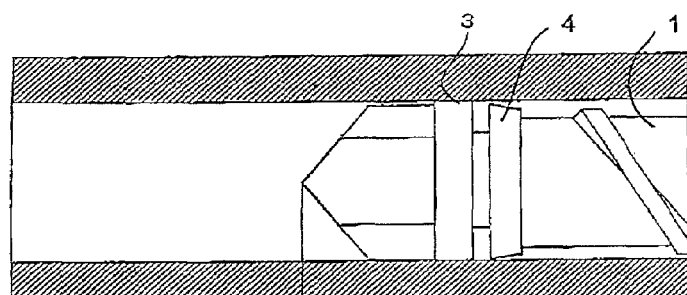

FIG. 3B shows a state after suck back processing for retreating the screw 1 by a predetermined amount after the completion of metering step is completed. With this suck back processing, the pressure of the molten resin in the cylinder 7 at the tip end of the screw head 2 is lowered, and a state where the check ring 3 is in open state is maintained.

Figure 3C:
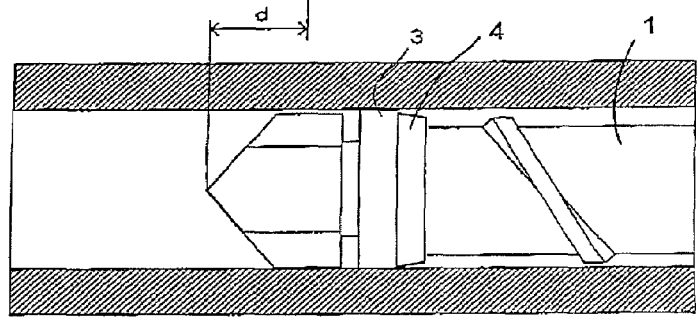

FIG. 3C shows a state where the injection is started and the check ring 3 is closed. A state from (b) to FIG. 3C is a section where resin flows reversely, and shows a screw movement distance d from the start of injection up to the close of the check ring 3. That is, if the screw 1 is moved forward to carry out the injection from the state where the suck back shown in FIG. 3B is completed, the check ring 3 moves backward when the pressure in front of the check ring mechanism becomes higher than the pressure of resin existing in the groove 6 between the flights 5 due to the charging pressure, the check ring 3 comes into intimate contact with the check seat 4 (the check ring 3 is closed) and the resin passage is closed.

Figure 3D:
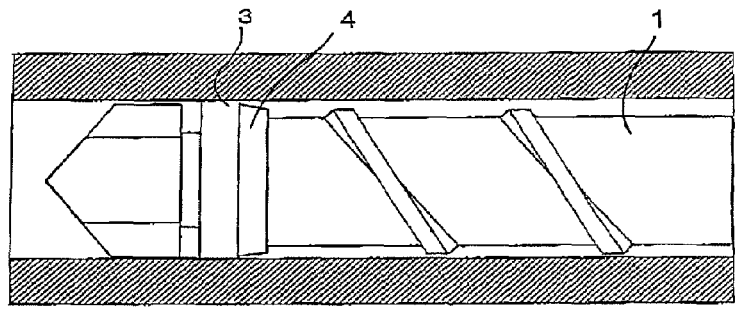

FIG. 3D shows a state where the screw 1 further moves forward from the position shown in FIG. 3C and reaches an injection/hold pressure switching position.

FIG. 4A to FIG. 4D are explanatory diagrams of molding operation having a screw-advancing step for closing the check ring 3 between the metering step and an injection step.

Figure 4A:
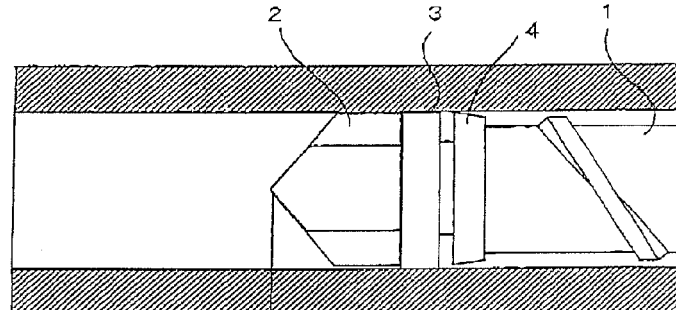
FIG. 4A to FIG. 4D are explanatory diagrams of an operating state of the check ring mechanism when a screw-advancing step is added between the metering step and the injection/hold pressure step.

FIG. 4A shows a position of the screw when the metering step is completed and a state of the check ring mechanism. This state is the same as that shown in FIG. 3A.

Figure 4B:
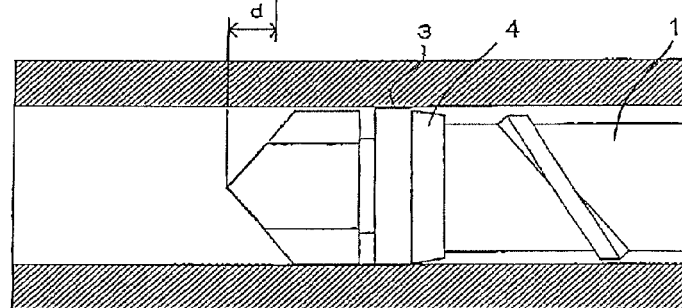

FIG. 4B shows a state where the screw 1 is moved forward and the check ring 3 is closed in the screw-advancing step before the injection is started after the metering is completed.

Figure 4C:
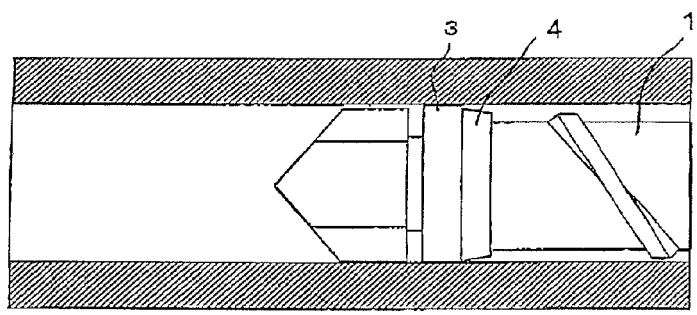

FIG. 4C shows a state where the screw 1 is retreated to an injection starting position after the check ring 3 is closed. In this state also, the check ring 3 is closed.

Figure 4D:
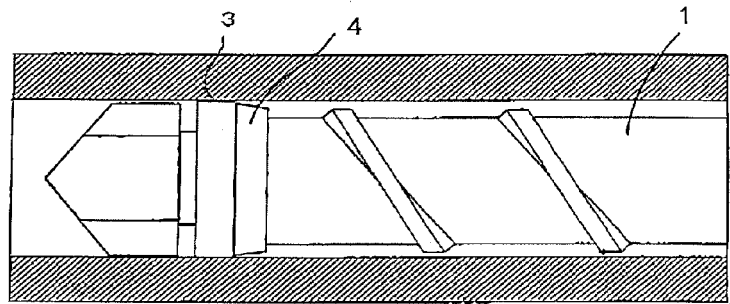

FIG. 4D shows a state where the screw 1 is moved forward from the injection starting position (position shown in FIG. 4C) to execute the injection/hold pressure step in a state where the check ring 3 is closed.

A screw forward and backward moving processing in which the screw 1 is moved forward as shown in FIG. 4B from the state shown in (a) to the state shown in FIG. 4B and the screw 1 is retreated to the injection starting position shown in FIG. 4C is called "pre-injection screw movement step" hereinafter.

As described above, there are two ways for executing the injection/hold pressure step after metering step is completed. That is, a first way is to start the injection/hold pressure step in a state where the check ring 3 is opened after the metering step is completed as shown in FIG. 3A to FIG. 3D, and a second way is to provide the screw-advancing step for closing the check ring 3 between the metering step and the injection step and to start the injection/hold pressure step in a state where the check ring 3 is closed, as shown in FIG. 4A to FIG. 4D.

In both the ways, the injection amount (i.e., the weight of resin to be charged into a mold) is varied due to variation of the closing point in time of the check ring 3 and as a result, it is desired to precisely detect the closing point in time of the check ring 3.

Hence, according to the present invention, the rotational force of the screw is detected, and timing in which the rotational force reaches its peak is detected, thereby detecting the closing point in time of the check ring 3.

Figure 5:
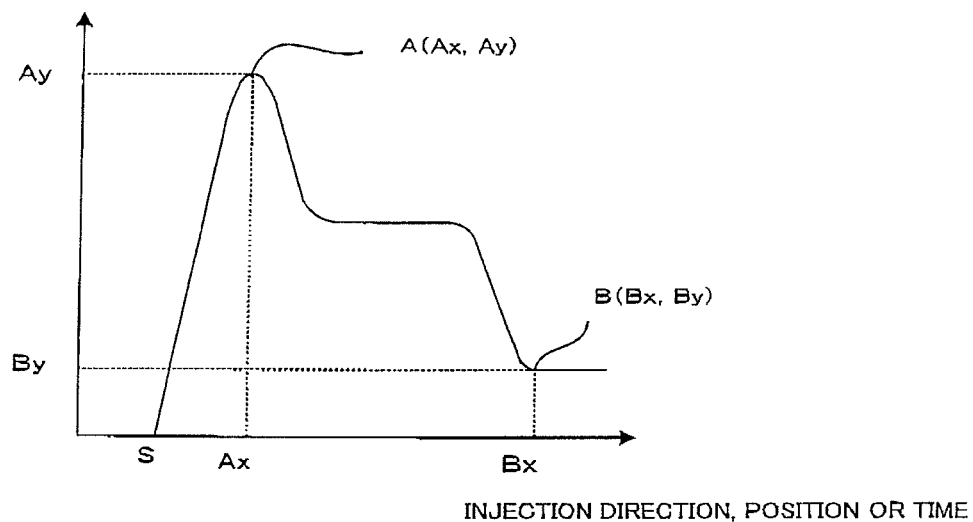
FIG. 5 is an explanatory diagram of a closing point in time of the check ring.

FIG. 5 is an explanatory diagram of detection of the closing point in time of the check ring of the invention.

In FIG. 5, the horizontal axis shows time or a screw position in the injection direction, and a vertical axis shows a rotational force acting on the screw. In FIG. 5, a point S is a forward-movement starting point of the screw. The backflow of resin is started from a gap between the check ring and a check seat at the same time at which the forward movement of the screw is started and thus, the rotational force of the screw is increased by the backflow of the resin. That is, the backflow of resin is started at the same time at which the injection is started in a state where the check ring 3 shown in FIG. 3B is in open state. In the method shown in FIG. 4A to FIG. 4D, the pre-injection screw movement step is started from the state shown in FIG. 4A, the backflow of resin is started when the screw 1 is moved forward, the pressure of the reversely flowing resin acts on the flight 5 of the screw 1, and a rotational force for rotating the screw 1 is generated.

As shown in FIG. 3C and FIG. 4B, if the check ring 3 which has been open up to that time is closed, the backflow is eliminated and thus, the rotational force starts reducing. As a result, the rotational force reaches its peak value (point A in FIG. 5) when the check ring 3 is closed from its open state. This point A of the peak value shows a close point of the check ring. A point B in FIG. 5 shows a switching point between the injection and the hold pressure.

Figure 6:
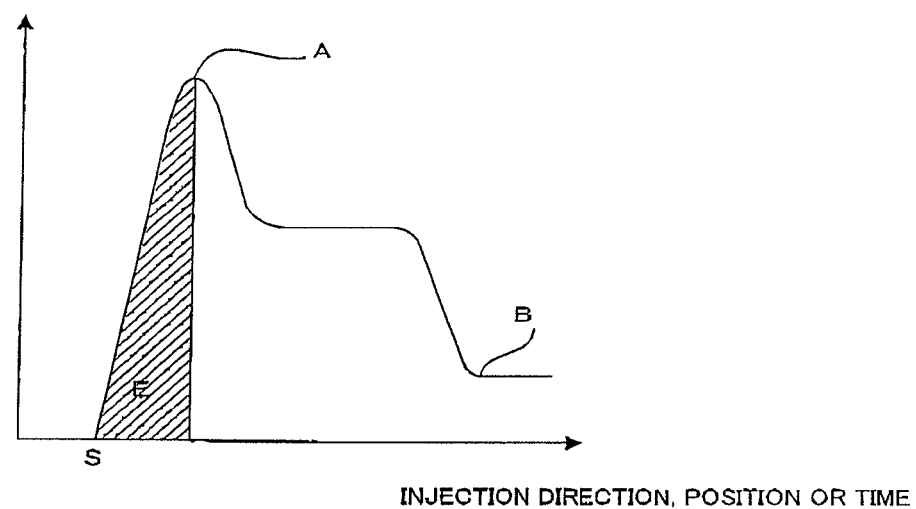
FIG. 6 is an explanatory diagram of an integration value of a rotational force for obtaining an index of a backflow amount of resin.

If coordinates of the point A is expressed with (Ax, Ay), the closing point in time of the check ring 3 (time or position) is designated with Ax. Here, if a variation of the Ax value (time or position) is sufficiently small, Ay is an index showing the backflow amount. To grasp a more precise backflow amount, a rotational force is integrated from the start of injection to the closing point A of the check ring (time integration or position integration), and an area of E shown in FIG. 6 is obtained. A time integration value of the rotational force from the screw forward-movement starting time (injection starting time) to the peak timing of rotational force acting on the screw, or the rotational force from the screw forward-movement starting time (injection starting time) to the rotational force peak timing is integrated with respect to the screw position is obtained, and these values are used as indices showing the backflow amount. The backflow amount of resin affects the amount of resin injected into a mold, and enhances or deteriorates the quality of a molded article. Thus, the peak value Ay of the rotational force and an integration value of the rotational force can be used as indices for determining whether a molded article is non-defective or defective and for adjusting a molding condition.

A movement distance of the screw from the screw forward-movement starting (injection starting) time to the detection time of the rotational force peak value is detected is a section where backflow of resin has been generated, and this movement distance of the screw also shows a backflow amount of resin. Therefore, this value can be used as an index for determining whether a molded article is non-defective or defective and for adjusting a molding condition. Further, coordinate systems showing the moving position of the screw are set. Therefore, a screw position where the peak value of the rotational force is detected can also be used as an index showing the backflow amount of resin, and this can also be used as an index for determining whether a molded article is non-defective or defective and for adjusting a molding condition.

Similarly, time elapsed from the screw forward-movement starting (injection starting) time until detection of a peak value of the rotational force can also be used as an index showing a backflow amount of resin, and this can also be used as an index for determining whether a molded article is non-defective or defective and for adjusting a molding condition.

If the closing point in time of the check ring is early (i.e., a backflow amount is small), the injection pressure rises early, and if the closing point in time of the check ring is late (i.e., the backflow amount is large), the injection pressure rises late. From this, the injection pressure at a predetermined screw position (or injection pressure at the time predetermined time elapsed after the screw forward-movement starting time) can be used as an index of the backflow amount of resin.

If the closing point in time of the check ring is early, the rising of the moving speed of the screw becomes late, and if the closing point in time of the check ring is late, the rising of the moving speed of the screw becomes early. Therefore, the moving speed of the screw at the time the peak of the rotational force of the screw is detected can be used as one index showing the backflow amount of resin or the resin amount to be charged into a mold, and this can also be used as an index for determining whether a molded article is non-defective or defective and for adjusting a molding condition.

In this invention, the time at which the peak of the rotational force acting on the screw is generated is determined as "time at which the check ring is closed", and it should be noted that "time at which the check ring is closed" is not limited to a time at which the check ring is physically closed.

A rotational force acting on the screw is reduced from its increasing state if resin does not flow reversely anymore, as described above, but to be strict, rotational force acting on the screw does not always start lowering from its increasing state when the backflow of resin becomes 0. Resin has viscosity and compressibility and a friction force is also applied. Therefore, when closing of the check ring makes progress and the gap of the check ring becomes sufficiently small, the resin pressure in front of the check ring is not transmitted to the flight of the screw behind the check ring any more even when the backflow of resin does not become 0 exactly, and the rotational force acting on the screw may be reduced from its increasing state. That is, it is conceived that if closing of the check ring makes progress and the gap of the check ring becomes sufficiently small, the rotational force acting on the screw may reach the peak even if the backflow of resin does not become 0 exactly. In this case, in the present invention, even if the backflow of resin does not become 0 exactly (even if the check ring is not closed physically), the time at which the rotational force reaches the peak is determined as "time at which the check ring is closed". Under such a situation, when it is determined that "the check ring is closed", the backflow of resin does not become 0 exactly but the gap of the check ring becomes a sufficiently small value such that a resin pressure in front of the check ring is not transmitted rearward of the check ring. Therefore, in the actual molding operation, there is no problem even if it is determined that "the check ring is closed" at that time. That is, the time at which the rotational force acting on the screw reaches the peak is not limited to the time at which the check ring is physically closed, but involves the time at which it can be regarded that the check ring is practically closed.

In the present invention, "to detect time at which the check ring is closed" is not limited to detection of time at which the check ring is physically closed, but also detection of time at which it can be regarded that the check ring is practically closed.

Figure 7:
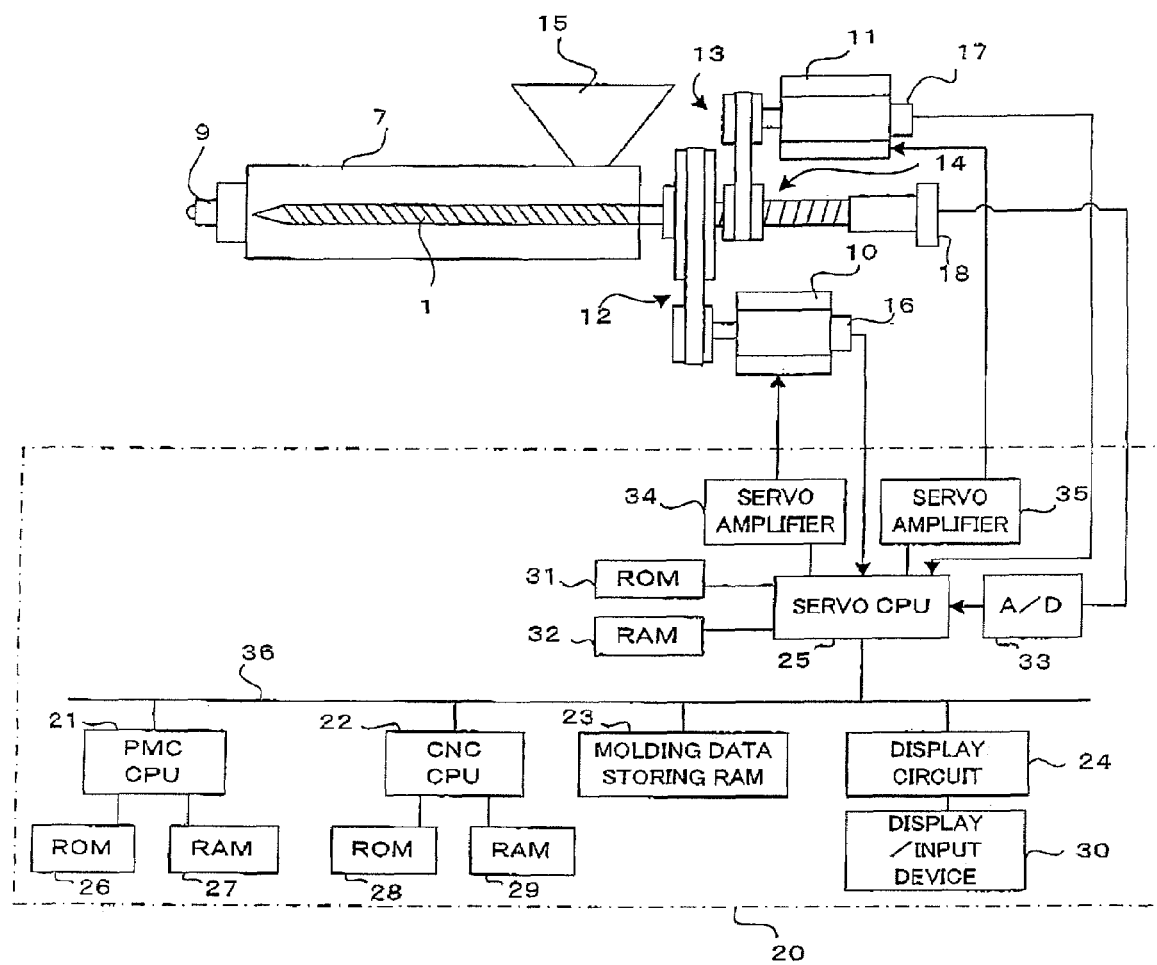
FIG. 7 is a block diagram of an essential portion of an embodiment of an injection molding machine according to the present invention.

FIG. 7 is a block diagram of an essential portion of an embodiment of the injection molding machine of the present invention.

Figure 1:
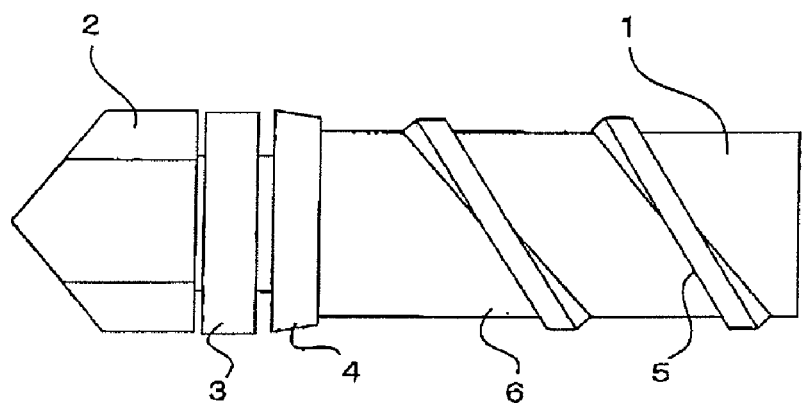
FIG. 1 is an explanatory diagram of one example of a check ring mechanism provided in a tip end of a screw.
Figure 2:
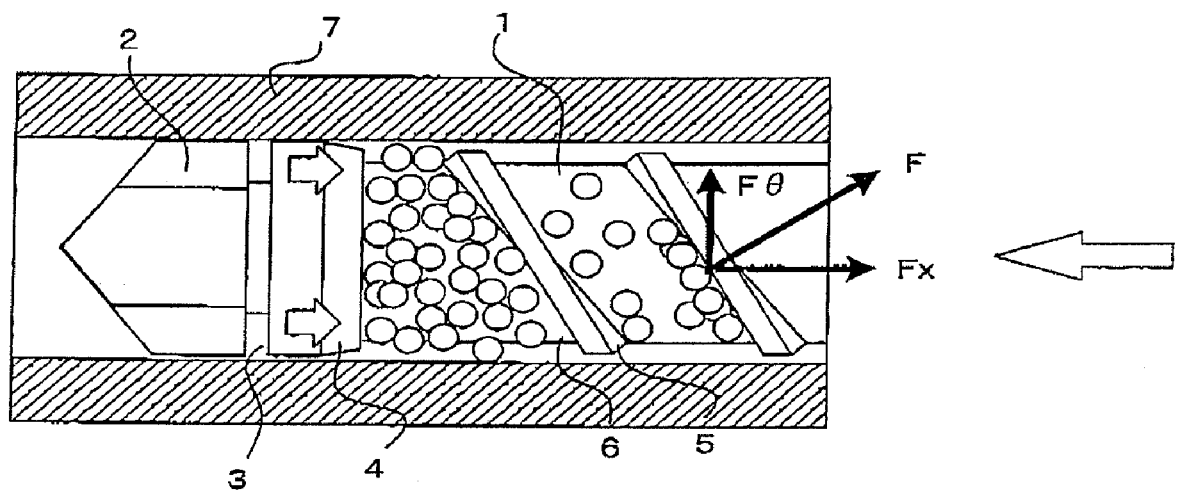
FIG. 2 is an explanatory diagram of a force applied to the screw when backflow of resin is generated while the screw moves forward.

A nozzle 9 is mounted on a tip end of a cylinder 7 into which the screw 1 is inserted, and a hopper 15 for supplying resin pellet into the cylinder 7 is mounted on a rear end of the cylinder 7. A backflow preventing mechanism comprising a check ring 3 and a check seat 4 is mounted on the tip end of the screw 1 as shown in FIG. 1.

The screw is rotated and driven by a metering servo motor 10 through a transmission mechanism 12, and also driven in an axial direction by an injecting servo motor 11 through a converting mechanism 14 which converts rotation motion of a transmission mechanism 13 and ball screw/nut to linear motion, thereby controlling injection and back pressure. Position/speed detectors 16 and 17 which detect rotation position/speed are mounted on the metering servo motor 10 and the injecting servomotor 11, respectively. The rotation speed of the screw 1 and the position (in the axial direction of the screw) and the moving speed (injection speed) of the screw 1 can be detected by the position/speed detector. A pressure sensor 18 such as a load cell which detects a pressure from the molten resin applied to the screw 1 is provided on the pressure sensor 18.

In a controller 20 which controls the injection molding machine, a CNC CPU 22 which is a microprocessor for controlling numerical values, a PMC CPU 21 which is a microprocessor for programmable machine controller, and a servo CPU 25 which is a microprocessor for servo controlling are connected to one another through buses 36.

A ROM 26 in which a sequence program for controlling sequence action of the injection molding machine, and a RAM 27 used for temporarily storing calculation data are connected to the PMC CPU 21. A ROM 28 in which automatic operating program for controlling the entire injection molding machine and a RAM 29 used for temporarily storing calculation data are connected to the CNC CPU 22.

A ROM 31 in which servo control program for carrying out processing of a position loop, a speed loop and a current loop is stored, and a RAM 32 used for temporarily storing calculation data are connected to the servo CPU 25. A servo amplifier 34 for driving a servo motor 10 for rotating the screw based on a command from the CPU 25 and a servo amplifier 35 for driving the injecting servo motor 11 which drives the screw in the axial direction and injects are connected to the servo CPU 25. The position/speed detectors 16 and 17 are respectively mounted on the servo motors 10 and 11, respectively, and output from the position/speed detectors 16 and 17 is fed back to the servo CPU 25.

The servo CPU 25 carries out feedback control of position/speed based on a moving command to respect axes (screw rotating servo motor 10 and injection servo motor 11) sent from the CNC CPU 22, and detected position/speed fed back from the position/speed detectors 16 and 17. The servo CPU 25 also performs feedback control of current, and controls driving of the servo motors 10 and 11 through the servo amplifiers 34 and 35. A current value register for storing a rotation position of the servo motor 11 for rotating the screw which is fed back from at least the position/speed detector 17 is provided, and a position (injection position) in the axial direction of the screw 1 can be detected by the rotation position of the servo motor 11.

A detected resin pressure (resin pressure acting on the screw 1) obtained by converting a detection signal at the pressure sensor 18 into a digital signal by an A/D converter 33 is input to the servo CPU 25.

Servo motors and servo amplifiers and the like which drive a mold-clamping mechanism and an injector mechanism are also provided, but since they do not relate to the present invention directly, they are omitted from FIG. 7.

An input device 30 having a display comprising liquid crystal or CRT is connected to a bus 36 through a display circuit 24. A molding data storing PRAM 23 which consists of a nonvolatile memory is also connected to the bus 36. Molding conditions concerning injection molding, various setting values, parameters, macro variables are stored in the molding data storing RAM 23.

The PMC CPU 21 controls the sequence action of the entire injection molding machine. The CNC CPU 22 distributes a moving command to the servo motors of the respective axes based on a operating program of the ROM 28 and the molding condition stored in the molding data storing RAM 23. The servo CPU 25 performs servo control such as the position loop control, the speed loop control and the current loop control like the conventional technique, based on the moving command distributed to the axes (servo motors for driving respective axes, such as screw rotating servo motor 10 and injecting servo motor 11), and on feedback signals of position and speed detected by the position/speed detector, and performs a so-called digital servo processing.

The above-described structure is basically the same as that of a controller of the conventional electric injection molding machine, but the invention is different from the conventional controller in that the structure of the invention has a function in which the screw is moved forward after the metering step is completed to detect a peak value of a rotational force applied to the screw, and a peak value detection time point is detected as a closing point in time of the check ring, and a function in which it is determined whether a molded article is non-defective or defective and a molding condition is adjusted based on the obtained closing point in time of the check ring.

According to an embodiment of the present invention, a disturbance estimation observer is used as detecting means for detecting a rotational force of the screw 1. That is, a load in the rotation direction of the screw received by the metering servo motor 10 as rotation driving means which rotates the screw is detected by a disturbance estimation observer incorporated in a driving control processing of the servo motor 10 executed by the servo CPU 25. Driving current of the servo motor 10 may be detected, instead of this observer, and the rotational force acting on the screw 1 may be obtained based on the detected driving current, or the screw may be provided with a strain gauge, and the rotational force may be obtained by output of the sensor.

A first embodiment of processing of the continuously molding cycle using the injection molding machine of the invention will be explained using a flowchart shown in FIG. 8.

Figure 8:
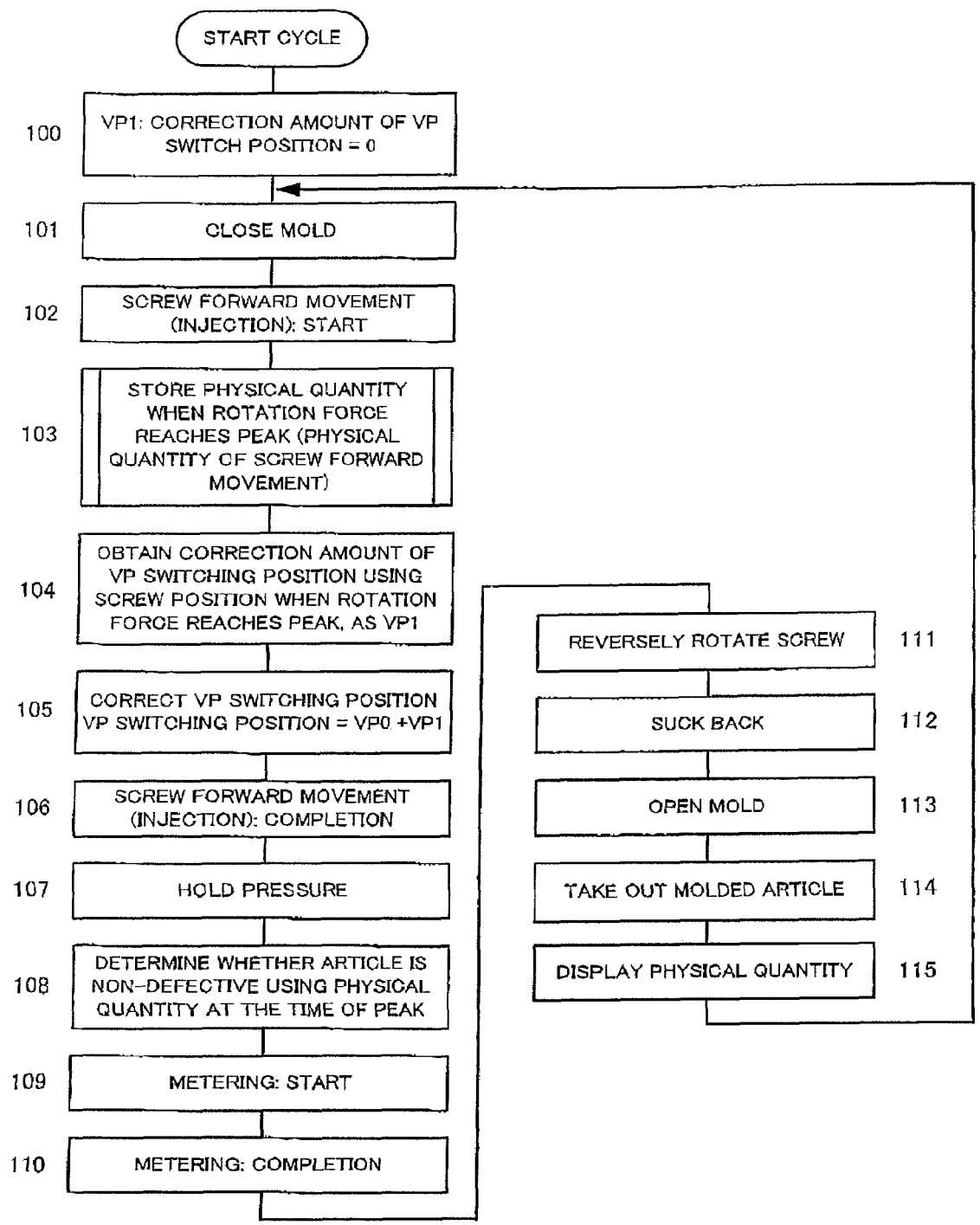
FIG. 8 is a flowchart showing a first example of a continuous molding cycle using the injection molding machine of the invention.

FIG. 8 is a flowchart showing an algorithm of processing for detecting a peak value of a screw rotational force when the screw moves forward in the injection/hold pressure step shown in FIG. 3A to FIG. 3D, for determining whether a molded article is non-defective or defective depending upon the detected peak value of the rotational force, screw position or time, and for correcting the molding condition such as the injection/hold pressure switching position and the injection speed switching position. In this embodiment, this processing is executed by the PMC CPU 21. In this embodiment, a correction amount of the injection/hold pressure switching position is obtained based on the screw position where the peak value of the rotational force is detected, and this injection/hold pressure switching position is changed.

Relating to the present invention, the injection/hold pressure switching position (hereinafter referred to as VP switching position) VP0 is set as the molding condition. A position of the screw for determining that the check ring is closed is set as a "reference check ring closing position". This reference check ring closing position is a position of the screw where when the injection molding is carried out and an non-defective molded article is obtained, the screw rotational force at the time of the injection reaches a peak. Alternatively, the average value of screw positions where screw rotational forces reach the peaks at the time of injection in a plurality of molding cycles when non-defective molded articles are obtained may be set as the reference check ring closing position.

If a cycle start command for the continuous molding is input, the PMC CPU 21 starts the processing shown in FIG. 8.

First, a register for storing a correction amount VP1 of a VP switching position VP0 is set to "0" (step 100) a mold clamping servo motor (not shown) is driven and controlled, and a clamping step is executed (step 101). If a mold is closed until a set clamping force is generated, the injection/hold pressure step is started, the servo CPU 25 drives and controls the injecting servo motor 11 through the servo amplifier 35, the screw 1 is moved forward (leftward in FIG. 7), and molten resin accumulated in the cylinder 7 in front of the screw 1. A peak value of the screw rotational force in the injection/hold pressure step is detected, and a physical amount when the peak value of the rotational force is detected is detected and stored (step 103).

Figure 9:
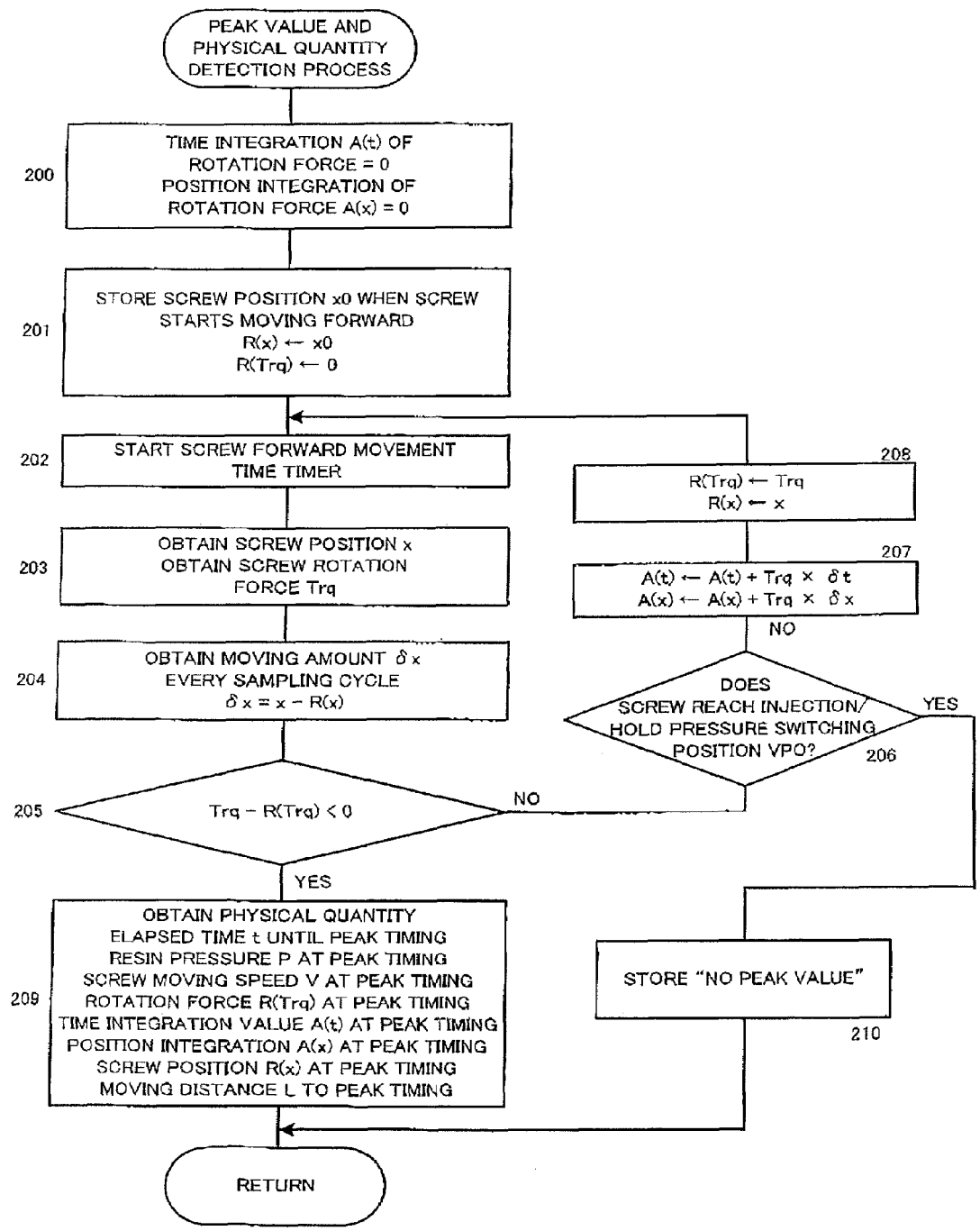
FIG. 9 is a flowchart showing detecting processing of a peak value and a physical amount of a screw rotational force when the screw moves forward.

The processing in step 103 for detecting and storing the rotational force peak value and a physical amount at that time is shown in FIG. 9.

The forward movement of the screw 1 is started for injection and at the same time, "0" is set in each register which stores a time integration value A(t) of a rotational force of the screw 1 and an integration value A(x) with respect to the screw position (step 200). Further, a screw position x when the forward movement of the screw 1 is started is read from the current position register, it is stored in a register R(x), and "0" is stored in a register R(Trq) which stores a rotational force Trq received by the screw rotation servo motor 10 (step 201). Further, a timer for counting time elapsed from the screw forward-movement starting time is started (step 202).

The screw position (rotation position of the injection servo motor) x stored in the current position register is obtained, a screw rotational force Trq obtained by the disturbance estimation observer is obtained (step 203), a position (initially "x0") at the time of previous sampling stored in a register R(x) is subtracted from the detected screw position x, and a screw moving amount δx (=x−R(x)) every sampling cycle is obtained (step 204).

Next, it is determined whether a value obtained by subtracting a screw rotational force (initially "0") at the time of previous sampling to be stored in the register R (Trq) from the screw rotational force Trq obtained in step 203 is a negative value (step 205). When the injection is started, resin flows reversely as described above, a rotational force is applied to the screw 1 by the backflow of resin, and the screw rotational force Trq obtained by the disturbance estimation observer is increased as shown in FIG. 5 and FIG. 6. Thus, a result of the determination in step 205 is initially "No". Hence, it is determined whether or not the screw position x obtained in step 203 reaches an injection/hold pressure switching position VP0 (step 206). If the screw position x does not reach the injection/hold pressure switching position VP0 yet, a value obtained by multiplying the screw rotational force Trq detected in step 203 by the sampling cycle δt is added to a register which stores the time integration value A(t) of the rotational force of the screw 1 (calculation of A(t)+Trq×δt), and the time integration value A(t) of the rotational force of the screw 1 is obtained (renewed). Further, a value obtained by multiplying the detected screw rotational force Trq by the moving amount δx in the sampling cycle obtained in step 204 is added to a register which stores the integration value A(x) with respect to the screw position (calculation of A(x)+Trq×δx), and the position integration value A(x) of the rotational force of the screw 1 is obtained (renewed) (step 207).

The screw rotational force Trq and the screw position x obtained in step 203 are respectively stored in the register R (Trq) which stores the screw rotational force Trq and the register R(x) which stores the screw position x (step 208), and the procedure is returned to step 203. In a state where it is determined "No" in step 205 and the screw position x does not reach the injection/hold pressure switching position VP0 which is set, the processing in steps 203 to 208 is executed every sampling cycle.

The screw 1 moves forward, the resin flows reversely as described above, and the screw rotational force Trq rises as shown in FIG. 5 and FIG. 6. If the check ring 3 is closed, the screw rotational force Trq is reduced. As a result, in step 205, a value obtained by subtracting, from a screw rotational force Trq detected at the time of current sampling, a screw rotational force which is detected at the time of previous sampling and stored in register R (Trq), becomes a negative value. From this, it is determine that the screw rotational force Trq reaches the peak (step 205), and a physical amount at the time the peak value is detected is obtained. That is, when it is determined that Trq−R(Trq)<0 in step 205, the physical amount is read and stored.

Hence, elapsed time t of the timer, injection pressure P detected by the pressure sensor 18, and a screw moving speed V which is fed back from the position/speed detector 17 are read, and the read time t, injection pressure P and the screw moving speed V are determined as elapsed time t, resin pressure P and screw moving speed V at the time the rotational force is at the peak, respectively.

When a result of determination in step 205 is Yes, the rotational force exceeds the peak and thus, time obtained by subtracting one sampling cycle δt from the elapsed time t read from the timer may be defined as elapsed time up to the peak of the rotational force. The injection pressure and the screw moving speed may be obtained in each cycle in step 203 and stored in a register in step 208, and when it is determined Yes in step 205, the injection pressure and screw moving speed stored in this register may be defined as an injection pressure and a screw moving speed at the time the rotational force is at the peak.

The screw rotational force Trq stored in the register R(Trq), time integration value A(t) and a position integration value A(x) of the screw rotational force stored in a register, a screw position at the time the rotational force is at the peak stored in the register R(x), a movement distance L (=R(x)−x0) from the start of forward movement of the screw until the screw rotational force reaches the peak, which is obtained by subtracting the screw forward movement starting position x0 from the screw position stored in this register R(x), is stored as a physical amount at the time the screw rotational force is at the peak (step 208).

When the peak value of the screw rotational force is not detected and it is determined that the screw position x detected in step 203 reaches the set injection/hold pressure switching position VP0 (step 206), "no peak value" is stored (step 210), and the rotational force peak value and the physical amount detecting processing is completed.

If the physical amount at the time the screw rotational force is at the peak is stored or "no peak value of rotational force" is stored in this manner, the procedure is returned to the main processing shown in FIG. 8, a difference between the obtained screw position at the time the screw rotational force is at the peak and a set reference check ring closing position is obtained as the correction amount VP1 of the VP switching position (step 104). When there is no peak value of rotational force, "0" is stored as the correction amount VP1.

The correction amount VP1 obtained in this manner is added to the VP switching position VP0, and a corrected VP switching position is obtained (step 105). When a correction amount is to be obtained, a coefficient may be defined, and an injection/hold pressure switching position may be corrected using difference×coefficient=correction amount VP1. An upper limit and a lower limit (it may be a negative value) may be set for the correction amount so that the correction amount does not go beyond the upper limit or lower limit.

If the injection is carried out until the screw reaches the VP switching position which is obtained and corrected in this manner, the procedure is shifted from the injection step to the hold pressure step (steps 106 and 107).

The processing in the hold pressure step is carried out (step 107), it is determined whether a molded article is non-defective or defective based on the obtained physical amount at the time the rotational force is at the peak, and non-defective/defective determining signal is output (step 108). The determination whether a molded article is non-defective or defective will be described later, but when the rotational force peak value is not detected, the determination whether a molded article is non-defective or defective is not made, and a molding discontinue signal is output.

If the hold pressure step is completed, the metering step is started, and the processing of the metering step which is the same as the conventional technique is carried out. If the metering step is completed (steps 109 and 110), the screw is rotated reversely by a predetermined amount (step 111) and then, the suck back processing is carried out (step 112), the mold is opened and a molded article is taken out (steps 113 and 114).

When the molded article is taken out, an non-defective molded article and a defective molded article are discriminated and taken out based on the determination result in step 108. The obtained physical amount is displayed on a display screen of the display/input device 30 (step 115), one molding cycle is completed, the procedure is returned to step 101 and a next molding cycle is carried out.

The reversely rotating processing in step 111 and the suck back processing in step 112 are not carried out in some cases, and it is not always necessary to carry out these steps.

As described above, in this embodiment, the injection/hold pressure switching position of the molding condition is corrected in step 105 based on the screw position at the time the check ring is closed (at the time the screw rotational force is at the peak), and it is determined whether a molded article is non-defective or defective in step 108 based on various physical amounts detected when the check ring is closed (when the screw rotational force is at the peak).

The non-defective/defective determination of a molded article made in step 108 will be explained below.

The following items are studied in determining whether a molded article is non-defective or defective:

- a position x of the screw at the time the check ring is closed (when peak of the rotational force is generated),
- a movement distance L of the screw during a period from the time the screw starts moving and the time the check ring is closed,
- elapsed time t during a period from time the screw starts moving and time the check ring is closed,
- an injection pressure P at the time the check ring is closed,
- a moving speed (injection speed) V of the screw at the time the check ring is closed,
- a screw rotational force Trq at the time the check ring is closed,
- a time integration value A(t) of a rotational force of the screw during a period from the time the screw starts moving and the time the check ring is closed, and
- a value A(x) obtained by integrating a rotational force of the screw during a period from time the screw starts moving and time the check ring is closed with respect to the screw position.

These values are compared with a reference value to determine non-defective or defective. Determination may be made using two or more of the above items.

The screw position x at the time the check ring is closed, and the movement distance L of the screw and the elapsed time t until reaching that timing from the start of injection become indices showing a backflow amount of resin, as described above, and thus, these can be items for determining whether a molded article is non-defective or defective. The peak value Trq of the screw rotational force at the time the check ring is closed, the time integration value A(t) of the screw rotational force and the position integration value A(x) become indices showing a backflow amount of resin and thus, these can be items for determining whether a molded article is non-defective or defective. Further, as described above, the injection pressure P at the closing point in time of the check ring and a moving speed V of the screw become indices of backflow of resin and thus, these are items for determining whether a molded article is non-defective or defective.

Although all of the physical amounts of the above-described items are obtained in the embodiment shown in FIG. 9, only physical amounts of items required for the non-defective/defective determination of the molded article may be obtained and stored.

For example, if the non-defective/defective determination of the molded article is made based on the screw position x at the closing point in time of the check ring (at the time the screw rotational force is at the peak), the processing in steps 200, 202 and 206 shown in FIG. 9 is unnecessary, and a physical amount to be obtained and stored in step 208 is only the screw position x at the time rotational force is at the peak to be stored in the register R(x). Further, non-defective/defective determination of the molded article in step 108 is made based on the screw position x at the time the obtained rotational force is at the peak (e.g., depending upon whether the screw position x is in a set tolerance).

That is, although FIG. 9 shows the example in which all of physical amounts which can be used for non-defective/defective determination of the molded article are obtained, only a physical amount used for correcting the molding condition (injection/hold pressure switching position) and a physical amount at the time a rotational force is at the peak which is utilized for the non-defective/defective determination may be detected and stored. The detected physical amounts are compared with the tolerances which are set for the physical amounts and the non-defective/defective determination of the molded article is made.

Further, the non-defective/defective determination of the molded article can be made using the following items:

- a movement distance of the screw from the screw position x at the closing point in time (at the time the rotational force is at the peak) of the check ring to a screw position at the time the hold pressure step is completed (this screw movement distance becomes an index showing an amount of resin to be charged into a mold or a weight of a molded article, and an index expressing quality of a molded article),
- a movement distance of the screw from the screw position x at the closing point in time of the check ring to a screw position at the time of switching between the injection step and the hold pressure step (this screw movement distance is an index showing an amount of resin to be charged into a mold or a weight of a molded article, and an index expressing quality of a molded article),
- a movement distance of the screw from the screw position x at the closing point in time (at the time the rotational force is at the peak) of the check ring to a screw position at the time the screw moves most forward position in the injection/hold pressure step (this screw movement distance becomes an index showing an amount of resin to be charged into a mold or a weight of a molded article, and an index expressing quality of a molded article).

A screw position at the closing point in time of the check ring is set as a "reference screw position", and a screw position which is separated away from this reference screw position by a predetermined distance is defined as a second reference screw position or third reference screw position, and one of more reference screw positions are set, and the non-defective/defective determination of the molded article may be made using an injection pressure at the time the screw position during injection reaches the second reference screw position or the third reference screw position. In this case, the reference screw position may be set using a movement distance of the screw from the start of injection (defined as a reference screw movement distance), and the non-defective/ defective determination of the molded article may be made by detecting an injection pressure at the time the movement distance of the screw from the start of injection reaches the reference screw movement distance. In this case, in the processing for obtaining a physical amount shown in FIG. 9, it is necessary to detect and store an injection pressure every set screw position or screw movement distance after the injection is started.

Similarly, elapsed time from the start of injection to the closing point in time of the check ring is set as a "reference injection elapsed time", an injection pressure at the time elapsed time from the start of injection becomes equal to the reference injection elapsed time is detected in a molding cycle after the reference injection elapsed time is set, and the non-defective/defective determination of the molded article may be made using the detected injection pressure. In this case also, timing from which predetermined time is elapsed after the reference injection elapsed time is defined as second reference injection elapsed time or third reference injection elapsed time, and one or more reference injection elapsed time may be set, and the non-defective/defective determination of the molded article may be made using a injection pressure when time elapsed after the start of injection reaches the second or third reference injection elapsed time.

In the "reference screw position" and the "reference injection elapsed time", it is possible to set a screw position at the closing point in time of the check ring in a specific molding cycle such as a molding cycle in which an non-defective molded article is molded, and elapsed time from the start of injection. Further, statistical analysis may be performed for screw positions at the closing point in time of the check ring in the past predetermined molding cycles and elapsed time from the start of injection, a representative value such as an average value, a median value and a mode value is obtained, and the obtained representative value may be set as a reference check ring closing position (or reference injection/hold pressure switching movement distance).

The injection pressure or the screw moving speed at the closing point in time (at the time the rotational force is at the peak) of the check ring can be used as indices which show a backflow amount of resin or an amount of resin to be charged into a mold, and the non-defective/defective determination of the molded article can be made by the injection pressure P or the injection speed V.

A second example of the processing of the continuously molding cycle using the injection molding machine of the invention will be explained using a flowchart shown in FIG. 10.

Figure 10:
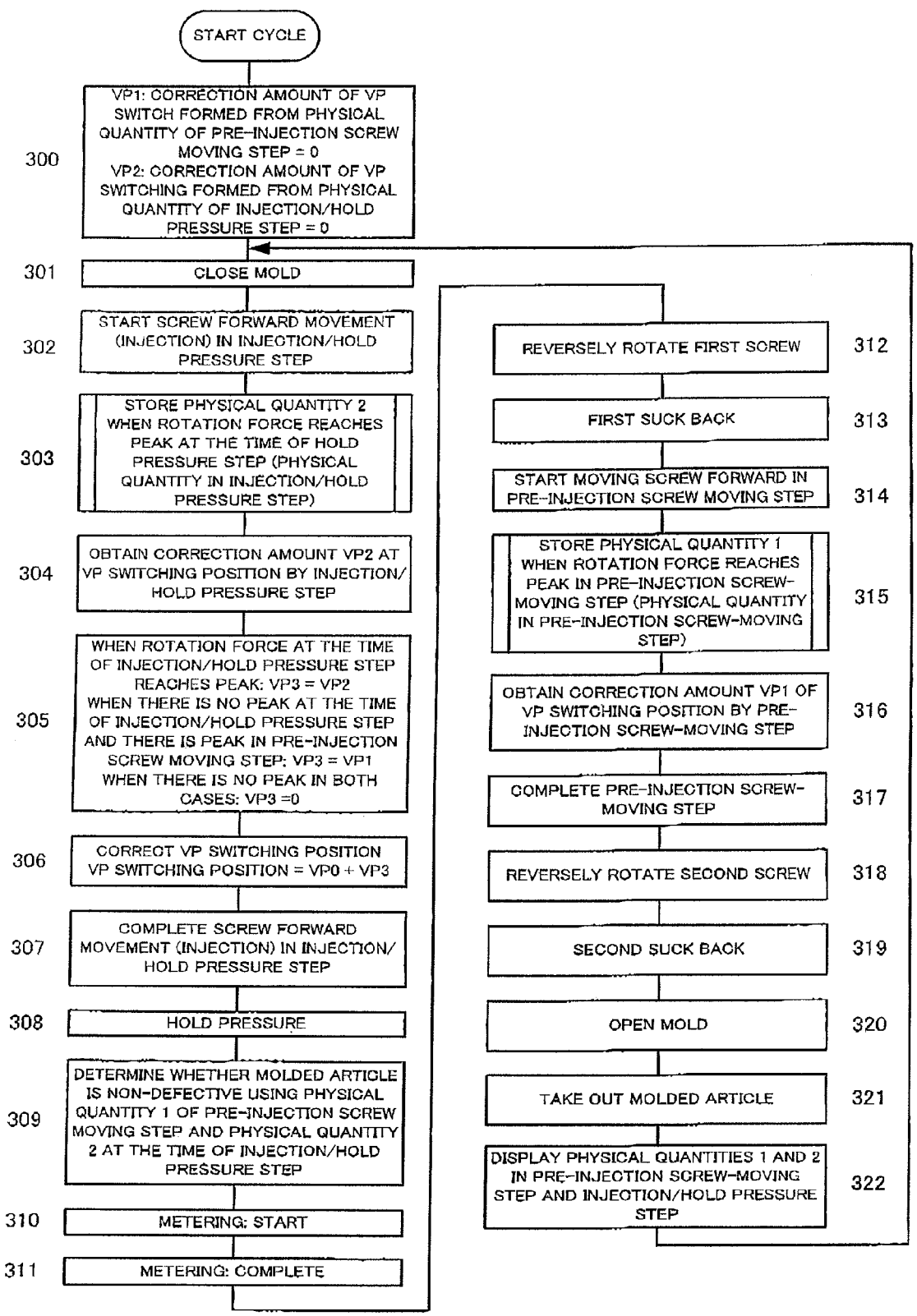
FIG. 10 is a flowchart showing a second example of a continuously molding cycle using the injection molding machine of the invention.

FIG. 10 shows molding cycle processing in which a pre-injection screw movement step for moving the screw is added between the metering step and the injection/hold pressure step shown in FIG. 4A to FIG. 4D.

Relating the embodiment, a force for forwardly moving the screw in the pre-injection screw movement step (advancing pressure), an injection/hold pressure switching position (called VP switching position) VP0, and "reference backflow preventing closing position" are set as molding conditions. Here, the "reference check ring closing position" is a screw position at the time the check ring is regarded to be closed, and is a screw position where a screw rotational force at the time of pre-injection screw moving reaches its peak, in a molding cycle immediately before a molding cycle in which the injection molding is carried out and an non-defective molded article is obtained. Alternatively, the average value of screw positions where screw rotational forces at the time of pre-injection screw moving in a plurality of molding cycles in which non-defective molded articles are obtained reach the peak is obtained and set as the reference check ring closing position.

If a cycle start command for continuously molding is input, the PMC CPU 21 starts the processing shown in FIG. 10.

First, "0" is set in a register which stores the correction amount VP1 of the VP switching position (injection/hold pressure switching position) formed from a physical amount obtained by the pre-injection screw movement step (first screw forward movement), and "0" is set in a register which stores a correction amount VP2 of a VP switching position by a physical amount obtained by the injection/hold pressure step (second screw forward movement) (step 300), a mold clamping servo motor (not shown) is driven and controlled, and the clamping step is executed (step 301).

If the mold is closed until a set clamping force is generated, the injection/hold pressure step is started, the servo CPU 25 drives and controls the injecting servo motor 11 through the servo amplifier 35, forwardly moves the screw 1 (leftward in FIG. 7), and injects molten resin accumulated in the cylinder 7 in front of the screw 1 into the mold. The rotational force peak value is detected during injection and retreating operations in the injection/hold pressure step, and a physical amount (this physical amount is called "physical amount 2") at the time the rotational force peak value is detected is detected and stored (step 303).

The processing in step 303 for detecting and storing the rotational force peak value and the physical amount at that time is the same as that in the first example of the continuous molding cycle explained using the flowchart in FIG. 8, and the processing shown in FIG. 9 is executed. However, the peak value of the screw rotational force obtained during this injection/hold pressure step and various physical amounts at the time the peak value is obtained are stored as physical amounts 2 at the time of the injection/hold pressure step.

The physical amount 2 at the time the screw rotational force is at the peak is stored by the processing shown in FIG. 9, and when no rotational force peak value is detected, information without the rotational force peak value is stored. A difference between a screw position at the time of the obtained peak of the screw rotational force and the reference check ring closing position is obtained as the correction amount VP2 of the VP switching position (step 304). When there is not rotational force peak value, "0" is stored as the correction amount VP2.

When a peak value of the rotational force is required in the injection/hold pressure step, the correction amount VP2 obtained in the injection/hold pressure step is used as a correction amount VP3 of the injection/hold pressure switching position. When the rotational force peak value is not required in the injection/hold pressure step and the correction amount VP2 is "0", the correction amount VP1 obtained in the later-described pre-injection screw movement step is used as the correction amount VP3 of the injection/hold pressure switching position. If the rotational force peak value is not required in both the injection/hold pressure step and pre-injection screw movement step and the correction amount VP1 is equal to VP2 and also equal to 0 (VP1=VP2=0) "0" is set as the correction amount VP3 (step 305).

The obtained correction amount VP3 is added to the set VP switching position VP0, and a corrected VP switching position is obtained (step 306). If the injection is carried out until the screw reaches the VP switching position which is obtained and corrected in this manner, the injection step is shifted to the hold pressure step and the processing in the hold pressure step is carried out (steps 307 and 308).

When the correction amount VP2 obtained in the injection/hold pressure step is used as the correction amount VP3 of the injection/hold pressure switching position in step 305, the non-defective/defective determination of the molded article is made based on the "physical amount 2" during the hold pressure step, and when the correction amount VP1 obtained in the pre-injection screw movement step is used as the correction amount VP3, the non-defective/defective determination of the molded article is made based on the "physical amount 1" during the hold pressure step (step 309). This non-defective/defective determination of the molded article is the same as that in the first example of the continuously molding cycle processing explained using the flowchart in FIG. 8.

When the rotational force peak value is not detected in both the injection/hold pressure step and pre-injection screw movement step, the non-defective/defective determination of the molded article is not made and a signal such as a molding discontinue signal is output.

When the hold pressure step is completed, the metering step is started (step 310), the same metering step as that of the conventional technique is carried out, and when the metering step is completed (step 311), the screw is reversely rotated by a predetermined amount (the "first reverse rotation of the screw" is carried out) to make it easy to close the check ring 3 (step 312) and then, the "first suck back processing" is carried out (step 313). The steps 312 and 313 are not always necessary, and these two steps may be omitted.

Next, the injecting servo motor 11 is driven under a predetermined pressure (predetermined torque), and the screw advancing processing in the pre-injection screw movement step is carried out. The movement of the screw is carried out until the pressure sensor 18 detects that the pressure of the molten resin reaches a predetermined pressure and the movement of the screw is stopped (step 314).

Detection of the screw rotational force peak value and the physical amount is carried out during the advancing movement of the screw in the pre-injection screw movement step (step 315). This processing is almost the same as detecting processing of the rotational force peak value and the physical amount shown in FIG. 9 but in this embodiment, it is determined in step 206 whether a pressure detected by the pressure sensor 18 reaches a set pressure or not. Instead of this, it may be determined whether the movement of the screw is stopped or not in step 206. This is because that when the pressure detected by the pressure sensor 18 reaches a predetermined pressure, the movement of the injection servo motor driven by a torque command of the set predetermined pressure is stopped.

That is, even when the screw moves forward in the pre-injection screw movement step, the screw rotational force generated by the backflow of resin is detected, its peak value is obtained, and each physical amount at the time the peak value is obtained is obtained and stored. When it is determined that a pressure detected by the pressure sensor 18 reaches a pressure (torque command) for moving the screw forward, or when it is determined that the forward movement of the screw is stopped, "no rotational force peak value" is stored.

A difference between the obtained screw position at the time of peak of the screw rotational force and the set reference check ring closing position is obtained as a correction amount VP1 of the VP switching position in the pre-injection screw movement step (step 316). When there is no rotational force peak value, "0" is stored as the correction amount VP1.

If the forward movement of the screw in the pre-injection screw movement step is completed (step 317), the screw is reversely rotated by a predetermined amount ("second reveres rotation of the screw" is carried out) (step 318), and the "second suck back" is carried out (step 319). The second reverse rotation of the screw and the second suck back processing are carried out for making it easier to close the check ring 3 when the injection is started in the injection/hold pressure step, and it is not always necessary to provide the steps 318 and 319.

The mold is opened and molded articles are taken out (steps 320 and 321). When the molded articles are taken out, non-defective molded articles and defective molded articles are distinguished based on the determination result in step 309. On the display/input device 30, the "physical amount 1" in the pre-injection screw movement step and the "physical amount 2" in the injection/hold pressure step are displayed (step 322), one molding cycle is completed, the procedure is returned to step 301 and the molding cycle is carried out.

In the second embodiment of the processing of the continuously molding cycle explained using the flowchart in FIG. 10 in the pre-injection screw movement step, the peak value of the rotational force applied to the screw due to a reversely flowing resin is detected in the injection/hold pressure step, and a physical amount 1 at that time is obtained. Further, a peak value of the rotational force applied to the screw due to a reversely flowing resin is detected, and a physical amount 2 at that time is obtained. Then, based on the obtained physical amount 1 and physical amount 2, the VP switching position is corrected and non-defective/defective determination of the molded article is made. However, a peak value of a screw rotational force and a physical amount may be detected in the pre-injection screw movement step without carrying out detection of a rotational force peak value and a physical amount in an injection/hold pressure step, and the VP switching position may be corrected and the non-defective/defective determination of the molded article may be made based on the detected physical amount ("physical amount 1"). In this case, processing in steps 303 to 305 are unnecessary, the processing in step 306 becomes "VP switching position=VP0+VP1", and the VP switching position is obtained by the correction amount VP1 calculated by the screw position at the time of peak of the rotational force obtained in the pre-injection screw movement step. The non-defective/defective determination of the molded article in step 309 is made by the physical amount 1 obtained in the pre-injection screw movement step. Concerning the information shown in step 322, only the physical amount 1 obtained in the pre-injection screw movement step is shown.

In each of the above embodiments, the injection/hold pressure switching position is set in the screw position (absolute position), and the position is corrected, but it is also possible to set the injection/hold pressure switching position using the movement distance of the screw from the start of injection instead. In this case also, the screw movement distance which switches from the injection control to the hold pressure control may be corrected by a difference between the screw position at the time of peak of the screw rotational force and the set reference check ring closing position or by the difference×coefficient.

The reference check ring closing position may also be set using the movement distance of the screw from the start of injection instead of the screw position (as reference check ring closing movement distance). In this case, the injection/hold pressure switching position is corrected by a difference between the reference check ring closing movement distance and the movement distance of the screw from the start of injection at the closing point in time of the check ring or by the difference×coefficient.

The reference check ring closing position (or reference check ring closing movement distance) may be set by obtaining a screw position (or movement distance of the screw) at the closing point in time of the check ring in a specific molding cycle such as a molding cycle in which an non-defective molded article is obtained. A statistical analysis may be performed for a screw position (or movement distance of the screw) at the closing point in time of the check ring of the past predetermined molding cycles, a representative value such as an average value, a median value and a mode value is obtained, and the obtained representative value may be set as a reference check ring closing position (or reference injection/hold pressure switching movement distance).

In each embodiments of the processing of the continuously molding cycle, the injection/hold pressure switching position (or the movement distance up to the injection/hold pressure switch) is corrected based on the detected closing point in time of the check ring (closing screw position, movement distance), but the switching position of the injection speed in the injection control of the injection/hold pressure step can be corrected based on the detected closing point in time of the check ring (closing screw position, movement distance), and thus more non-defective molded article can be obtained. In addition to the correction of the injection/hold pressure switching position, injection speed switching position may be corrected.

When the injection speed switching position is corrected, like the correction of the injection/hold pressure switching position described in steps 104 and 105 in the first example of the molding cycle shown in FIG. 8 and in steps 304 to 306 in the second embodiment of the molding cycle shown in FIG. 10, a reference injection speed switching position for correcting the injection speed switching position is set, a difference between the reference injection speed switching position and the screw position at the closing point in time of the check ring is obtained, and the injection speed switching position can be corrected using this difference as a correction amount. In this case also, a coefficient is determined in advance, and the injection speed switching position may be corrected using the difference× the coefficient as the correction amount. An upper limit and a lower limit (it may be a negative value) may be set for the correction amount so that the correction amount does not go beyond the upper limit or lower limit.

A plurality of injection speed switching positions are set in some cases, but all of the injection speed switching positions may be corrected or one or some of them (e.g., the last injection speed switching position) may be corrected.

The correction of the injection speed switching position can be applied to the switching of the injection speed carried out after the closing of the check ring is detected. That is, in a normal injection/hold pressure step, the closing point in time of the check ring comes earlier than the switching timing of the injection speed, for this reason, a correction value can be obtained from a difference between a screw position at the closing point in time of the check ring and the reference injection speed switching position and then, the injection speed switching position can be corrected in the same molding cycle. For example, if the sequence of the closing point in time of the check ring and the injection speed switching is in the order of 'closing of the check ring, switching from speed 1 to speed 2, and switching from speed 2 to speed 3', then the switching position from the speed 1 to speed 2 and a switching position from the speed 2 to the speed 3 can be corrected by a correction value obtained at the closing point in time of the check ring. If the sequence of the closing point in time of the check ring and the injection speed switching is in the order of 'switching from the speed 1 to the speed 2, the close of the check ring, and the switching from the speed 2 to screw 3', then the switching position from the speed 2 to the speed 3 can be corrected using a correction value obtained at the closing point in time of the check ring.

When the injection speed switching position is to be corrected, a screw position at the closing point in time of the check ring may be detected in the pre-injection screw movement step carried out after the measurement is completed and before the injection is started, and a correction value of the injection speed switching position may be obtained. In this case, in the screw-advancing step carried out after the measurement is completed and before the injection is started, a screw position at the closing point in time of the check ring is detected, a difference between the detected screw position at the closing point in time of the check ring and the reference injection speed switching position is obtained, the injection speed switching position is corrected by the difference or the difference x coefficient, and in the subsequent injection/hold pressure step, the injection speed is switched using the corrected injection speed switching position.

The injection speed switching position may be set using the movement distance of the screw from the start of injection, instead of the screw position, and the injection speed switching position may be corrected by a difference between the screw position at the time the screw rotational force is at the peak and the set reference check ring closing position or by the difference×coefficient.

In the reference injection speed switching position (reference injection speed switching movement distance), a screw position at the closing point in time of the check ring (or movement distance of the screw) in a specific molding cycle such as a molding cycle in which an non-defective molded article is molded can be set. A statistical analysis may be performed for a screw position (or movement distance of the screw) at the closing point in time of the check ring of the past predetermined molding cycles, a representative value such as an average value, a median value and a mode value is obtained, and the obtained representative value may be set as a reference injection speed switching position (or reference injection speed switching movement distance).

In the embodiments of the present invention described above, the injection molding machine is of electric motor-driven type, and the screw rotating means for rotating the screw is an electric servo motor. However, an electric motor or a hydraulic motor may be used as the screw rotating means instead of the electric servo motor. In the invention, when the screw is to be moved forward, the rotation of the screw may be stopped or the screw may be rotated at a predetermined rotation speed. When the screw is rotated at a predetermined rotation speed, the rotation direction is not limited. When the rotation of the screw is to be stopped, e.g., when the rotation driving means for rotating the screw is an electric servo motor, the electric servo motor may be brought into a positioning state so that the rotation position can be held, and when the rotation driving means is a hydraulic motor, an oil passage of the hydraulic motor is closed so that the rotation position can be held. A brake or a one-way clutch can be used for stopping the rotation of the screw.

In this embodiment, the disturbance estimation observer is used as means for detecting a rotational force of the screw, and the screw rotational force is obtained by a load torque obtained by the disturbance estimation observer. Alternatively, the screw rotational force may be obtained based on driving current of a screw rotating motor. When the rotation of the screw is to be stopped by braking means, a distortion sensor provided on the screw may detect the screw rotational force.

The invention claimed is:

1. An injection molding machine comprising:
a screw having a check ring, rotation driving means for rotating the screw, axial direction driving means for driving the screw in its axial direction, and
rotational force detecting means for detecting a rotational force acting on the screw, wherein:
when the screw is moved forward in a direction of injection by the axial direction driving means, a rotational force acting on the screw is detected by the rotational force detecting means; and
said injection molding machine further comprises rotational force peak time detecting means which detects a time at which the detected rotational force reaches a peak as a closing point in time of the check ring.

2. The injection molding machine according to claim 1, wherein the rotational force peak time detecting means detects the closing point in time of the check ring by forwardly moving the screw in an injection/hold pressure step.

3. The injection molding machine according to claim 1, wherein the rotational force peak time detecting means detects the closing point in time of the check ring by forwardly moving the screw during a period starting from completion of a metering step to a start of an injection step.

4. The injection molding machine according to claim 1, wherein the rotational force peak time detecting means detects the closing point in time of the check ring by forwardly moving the screw during the period from completion of an injection/hold pressure step and metering steps, to a start of an injection step, and
in the injection/hold pressure step, when a peak is not detected in the rotational force, a time at which a rotational force, detected by forwardly moving the screw during the period from completion of metering step to start of injection step, reaches the peak is defined as the closing point in time of the check ring.

5. The injection molding machine according to claim 1, further comprising:
physical amount detecting means for detecting a physical amount relating to injection molding at the closing point in time of the check ring detected by the rotational force peak time detecting means, and
first determining means which compares the physical amount detected by the physical amount detecting means with a predetermined tolerance, and when the detected physical amount is within the tolerance, the first determining means determines that a molded article is a non-defective article.

6. The injection molding machine according to claim 5, wherein:
said physical amount detected at the closing point in time of the check ring by the physical amount detecting means is one or more of the following physical amounts:
a screw position,
a movement distance of the screw during the time from the forward movement starting time of the screw to the closing point in time of the check ring,
time elapsed during the time from the forward movement starting time of the screw to the closing point in time of the check ring,
a molten resin pressures,
a moving speed of the screw,
a rotational force detected by the rotational force detecting means,
a time integration value of the rotational force during the time from the forward movement starting time of the screw to the closing point in time of the check ring, and
a value obtained by integrating the rotational force during the time from the forward movement starting time of the screw to the closing point in time of the check ring with respect to the screw position.

7. The injection molding machine according to claim 1, further comprising:
position detecting means for detecting a position of the screw in its axial direction,
second determining means which obtains a difference between the screw position detected by the position detecting means at the closing point in time of the check ring, and the screw position detected at a predetermined timing, compares the obtained difference with a predetermined tolerance, and determines, when the difference is within the tolerance, that a molded article is a non-defective article.

8. The injection molding machine according to claim 7, wherein said predetermined timing is one or more of the following timings:
hold pressure completion timing,
switching timing from the injection step to the hold pressure step, and
time at which the screw moved most forward in the injection/hold pressure step.

9. The injection molding machine according to claim 1, further comprising:
position detecting means for detecting a position of the screw in its axial direction,
means for storing a screw position detected by said position detecting means at the closing point in time of the check ring as a reference screw position,
pressure detecting means for detecting a molten resin pressure, and
third determining means which compares the molten resin pressure detected by the pressure detecting means when the screw reaches the reference screw position during the forward movement in a molding cycle after a molding cycle in which said reference screw position is stored, with a predetermined tolerance, and which determines, when the molten resin pressure is within the tolerance, that a molded article is a non-defective.

10. The injection molding machine according to claim 1, further comprising:
elapsed time measuring means for measuring elapsed time from screw forward-movement starting time at the time the check ring is closed,
means for storing the elapsed time measured by said elapsed time measuring means as reference screw forward movement elapsed time,
pressure detecting means for detecting a molten resin pressure, and
fourth determining means which compares, when an elapsed time from the screw forward-movement starting time during the forward movement of the screw becomes equal to the reference screw forward movement elapsed time in a molding cycle after a molding cycle in which the reference screw forward movement elapsed time is stored, a molten resin pressure detected by the pressure detecting means with a predetermined tolerance, and which determines, when the detected molten resin pressure is within the tolerance, that a molded article is a non-defective article.

11. The injection molding machine according to claim 1, further comprising:
position detecting means for detecting a position of the screw in its axial direction, injection/hold pressure switching position setting means for setting an injection/hold pressure switching position which is a screw position where the injection step is switched to the hold pressure step, reference check ring closing position setting means for setting a reference check ring closing position to correct the injection/hold pressure switching position, and injection/hold pressure switching position correcting means which detects a screw position at the closing point in time of the check ring, obtains a difference between the detected screw position and the reference check ring closing position, and corrects the injection/hold pressure switching position based on the obtained difference.

12. The injection molding machine according to claim 1, further comprising:

position detecting means for detecting a position of the screw in its axial direction, injection speed switching position setting means for setting the screw position for switching the injection speed in the injection step, reference injection speed switching position setting means for setting a reference injection speed switching position to correct said injection speed switching position, and injection speed switching position correcting means which detects a screw position at the closing point in time of the check ring, obtains a difference between the detected position and the reference injection speed switching position, and corrects the injection speed switching position based on the obtained difference.

13. The injection molding machine according to claim 11, wherein said injection/hold pressure switching position is set using a distance from the screw position at the screw forward-movement starting time.

14. The injection molding machine according to claim 11, wherein said injection/hold pressure switching position is set using a distance from the screw position at the screw forward-movement starting time, and a screw position detected at the closing point in time of the check ring is detected as a distance from the screw position at the screw forward-movement starting time.

15. The injection molding machine according to claim 12, wherein said injection speed switching position is set using a distance from the screw position at the screw forward-movement starting time.

16. The injection molding machine according to claim 12, wherein said reference injection speed switching position is set using a distance from the screw position at the screw forward-movement starting time, and said screw position detected at the closing point in time of the check ring is detected as a distance from the screw position at the screw forward-movement injection starting time.

* * * * *